United States Patent
Wakisaka et al.

(10) Patent No.: US 9,790,397 B2
(45) Date of Patent: *Oct. 17, 2017

(54) ANTICORROSIVE COATING COMPOSITION, ANTICORROSIVE COATING FILM, AND METHOD FOR PREVENTING CORROSION OF SUBSTRATE

(71) Applicant: CHUGOKU MARINE PAINTS, LTD., Otake-shi (JP)

(72) Inventors: Shingo Wakisaka, Otake (JP); Tomohisa Sumida, Otake (JP); Naoya Nakamura, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/761,507

(22) PCT Filed: Mar. 4, 2014

(86) PCT No.: PCT/JP2014/055399
§ 371 (c)(1),
(2) Date: Jul. 16, 2015

(87) PCT Pub. No.: WO2014/136753
PCT Pub. Date: Sep. 12, 2014

(65) Prior Publication Data
US 2015/0368505 A1 Dec. 24, 2015

(30) Foreign Application Priority Data

Mar. 8, 2013 (JP) ................................ 2013-047037

(51) Int. Cl.
*C08L 63/00* (2006.01)
*C09D 163/00* (2006.01)
(Continued)

(52) U.S. Cl.
CPC .......... *C09D 163/00* (2013.01); *C08F 220/18* (2013.01); *C08G 59/54* (2013.01);
(Continued)

(58) Field of Classification Search
CPC .......... C09D 5/08; C09D 163/00; C09D 7/12; C09D 133/10; C08F 220/18; C08G 59/54; C08G 59/56
(Continued)

(56) References Cited

U.S. PATENT DOCUMENTS 4,877,838 A * 10/1989 Toman ................. C09D 133/04
524/512
2002/0091197 A1 * 7/2002 Nakamura ............ C08F 220/18
525/123
(Continued)

FOREIGN PATENT DOCUMENTS

CN 101525519 A 9/2009
CN 102863858 A 1/2013
(Continued)

OTHER PUBLICATIONS

International Search Report issued Jun. 10, 2014 in PCT/JP2014/055399 filed Mar. 4, 2014.
(Continued)

*Primary Examiner* — David Karst
(74) *Attorney, Agent, or Firm* — Oblon, McClelland, Maier & Neustadt, L.L.P.

(57) ABSTRACT

The present invention relates to an anticorrosive coating composition comprising an epoxy resin (a), a curing agent (b), an amide wax (c), and a liquid acrylic polymer (d) including a structural unit derived from an acrylate having an alkyl group of 4 to 18 carbon atoms. The anticorrosive coating composition of the present invention can form an
(Continued)

anticorrosive coating film that is excellent adhesion to a metal substrate, anticorrosive properties and so on.

16 Claims, 1 Drawing Sheet

(51) Int. Cl.
    *C09D 5/08*     (2006.01)
    *C09D 7/12*     (2006.01)
    *C08F 220/18*     (2006.01)
    *C09D 133/10*     (2006.01)
    *C08G 59/54*     (2006.01)
    *C08G 59/56*     (2006.01)

(52) U.S. Cl.
    CPC ............... *C08G 59/56* (2013.01); *C09D 5/08* (2013.01); *C09D 7/12* (2013.01); *C09D 133/10* (2013.01)

(58) Field of Classification Search
    USPC .......................................... 523/400; 525/533
    See application file for complete search history.

(56) References Cited

U.S. PATENT DOCUMENTS

| | | |
|---|---|---|
| 2006/0264573 A1 | 11/2006 | Bennett et al. |
| 2010/0004355 A1* | 1/2010 | Sumida ................... C09D 5/08 523/400 |
| 2010/0152373 A1* | 6/2010 | Wakabayashi ..... C08G 65/2609 524/588 |

FOREIGN PATENT DOCUMENTS

| | | |
|---|---|---|
| JP | 49-48480 | 12/1974 |
| JP | 10-259351 A | 9/1998 |
| JP | 11-333374 A | 12/1999 |
| JP | 11-343454 A | 12/1999 |
| JP | 2000-37659 | 2/2000 |
| JP | 2000-38538 A | 2/2000 |
| JP | 2000-129168 A | 5/2000 |
| JP | 2006-342360 A | 12/2006 |
| JP | 2009-197106 A | 9/2009 |
| WO | WO 2006/125148 A1 | 11/2006 |

OTHER PUBLICATIONS

Combined Taiwanese Office Action and Search Report issued Mar. 13, 2015 in corresponding TW 103107604.

Extended European Search Report issued Aug. 12, 2016 in Patent Application No. 14760799.8.

Office Action issued May 31, 2016 in Japanese Patent Application No. 2015-504319.

Office Action issued Jun. 2, 2016 in Chinese Patent Application No. 201480012675.6 (with English translation of category of cited documents).

Combined Chinese Office Action and Search Report issued Jan. 22, 2017 in Chinese Patent Application No. 201480012675.6 (with English translation of categories of cited documents).

* cited by examiner

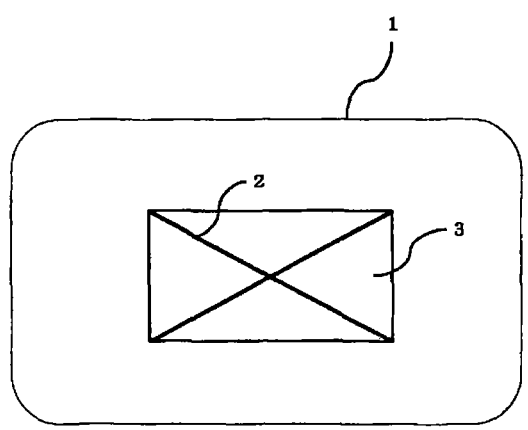

ANTICORROSIVE COATING COMPOSITION, ANTICORROSIVE COATING FILM, AND METHOD FOR PREVENTING CORROSION OF SUBSTRATE

TECHNICAL FIELD

The present invention relates to an anticorrosive coating composition, an anticorrosive coating film, and a method for preventing corrosion of a substrate. More particularly, the invention relates to an anticorrosive coating composition capable of forming an anticorrosive coating film excellent in adhesion to metal substrates, anticorrosive properties, and the like, an anticorrosive coating film formed from the composition, and a method for preventing corrosion of metal substrates using the composition.

BACKGROUND ART

Usually, for prevention of corrosion, large-sized steel structures such as ships, land structures, and bridges are subjected to anticorrosive coating using an anticorrosive coating composition. In the anticorrosive coating, an anticorrosive coating composition is applied on a surface of a steel plate or the like to form an anticorrosive coating film having a thickness of several hundred to several thousand micrometers. This allows the surface of the steel plate or the like to be covered with the anticorrosive coating film to prevent the steel plate or the like from contacting with oxygen, salt, vapor, and the like, thereby preventing the corrosion of the steel plate or the like.

In addition, when it is necessary to forma thick film having a thickness of several hundred to several thousand micrometers, an anticorrosive coating composition including an amide wax-based thixotropic agent as an anti-sagging and anti-settling agent (a thixotropic agent) is used. Such an anticorrosive coating composition is excellent in adhesion to substrate surfaces of steel structures and the like and anticorrosive properties under usual coating conditions.

As the coating composition, the present inventor has disclosed an anticorrosive coating composition including a non-tar-based epoxy resin, a curing agent, an epoxy group-containing alkoxysilane compound, a specific flaky pigment, and an extender pigment (Patent Literature 1).

In addition, in Patent Literature 2, there has been disclosed an epoxy resin coating composition that includes a bisphenol epoxy resin, an ethylene-vinyl acetate copolymer, and an amine-based curing agent.

CITATION LIST

Patent Literature

Patent Literature 1: JP-A-2000-129168.
Patent Literature 2: JP-A-2009-197106.

SUMMARY OF INVENTION

Technical Problem

A structure of a ship, such as a ballast tank, is also required to have anticorrosive properties and thus subjected to anticorrosive coating. For such a structure, an epoxy-based anticorrosive coating composition is usually used. In order to form an anticorrosive coating film having a sufficient film thickness, the coating composition including an amide wax-based thixotropic agent is applied and dried, and then furthermore, the coating composition is applied thereon and dried, thereby forming an anticorrosive coating film (double coating). In this case, for obtaining anticorrosive properties, it is important to ensure not only adhesion between a substrate and the coating film (or anticorrosive coating film) formed by the first coating, but also adhesion between the coating film (or the anticorrosive coating film) formed by the first coating and the coating film (or anticorrosive coating film) formed by the second coating.

Spray coating is often used to apply an anticorrosive coating composition on such a ship structure. In this case, for example, during the spray coating of a wall surface or a ceiling surface, spray dust tends to attach onto a surface different from a surface currently being coated, such as a floor surface.

In addition, particularly when the anticorrosive coating composition is coated by the double coating, there are cases in which a first coating film is formed on a part (A), and then, without or while drying the coating film, a first coating film is formed on another part (B). During the formation of the coating film on the part (B), spray dust (or the composition which gives a spray dust through drying) can attach to the coating film formed on the part (A). In such a case, the spray dust is partially taken into the coating film in a process up to drying the coating film formed on the part (A). It is thus difficult to remove the spray dust attached to the coating film surface when performing a second coating.

The present inventors performed spray coatings using conventionally known anticorrosive coating compositions such as the coating compositions described in Patent Literature mentioned above and found that spray dust as above tends to occur and reduce the adhesion of a film formed thereon.

In addition, even in the spray coating of an inside of a ship, such as a ballast tank, where ventilation after coating is difficult, a composition, which will become spray dust, can attach, particularly, onto a floor surface and the like of the ballast tank. Herein, due to the structure of the ballast tank, the vapor of a solvent contained in the coating composition tends to stay near the floor surface. Accordingly, the composition attached onto the floor surface and the like tends to be dried in the solvent atmosphere. In this case, the occurring spray dust has been found to tend to significantly reduce the adhesion of a film formed thereon.

The present invention has been accomplished in view of such circumstances. It is an object of the present invention to provide an anticorrosive coating composition that is excellent in adhesion to a substrate and anticorrosive properties and whose spray dust hardly reduces the adhesion of a film formed thereon to an object to be coated (a target to be coated) even when the spray dust has attached to the object to be coated.

Technical Solution

As a result of diligent research to solve the problems described above, the present inventors discovered that the problems could be solved by mixing a specific liquid acrylic polymer in an anticorrosive coating composition comprising an epoxy resin, a curing agent, and an amide wax, thereby completing the present invention. The structure of the present invention is as follows:

[1] An anticorrosive coating composition, comprising an epoxy resin (a), a curing agent (b), an amide wax (c), and a liquid acrylic polymer (d) including a structural unit derived from an acrylate having an alkyl group of 4 to 18 carbon atoms.

[2] The anticorrosive coating composition according to the [1], wherein the liquid acrylic polymer (d) includes a structural unit derived from an acrylate having an alkyl group of 4 to 18 carbon atoms containing a branched structure.

[3] The anticorrosive coating composition according to the [1] or [2], wherein the liquid acrylic polymer (d) includes a structural unit derived from isobutyl acrylate or 2-ethylhexyl acrylate.

[4] The anticorrosive coating composition according to the [3], wherein the liquid acrylic polymer (d) includes the structural unit derived from isobutyl acrylate or 2-ethylhexyl acrylate in an amount of from 30 to 100% by weight with respect to the whole of the liquid acrylic polymer (d).

[5] The anticorrosive coating composition according to the [3] or [4], wherein the liquid acrylic polymer (d) further includes a structural unit derived from n-butyl acrylate.

[6] The anticorrosive coating composition according to any one of the [1] to [5], wherein the liquid acrylic polymer (d) has a glass transition temperature of 0° C. or less.

[7] The anticorrosive coating composition according to any one of the [1] to [6], wherein the composition comprises the liquid acrylic polymer (d) in an amount of from 0.01 to 5 parts by weight (a nonvolatile content) with respect to 100 parts by weight of a nonvolatile content in the anticorrosive coating composition.

[8] The anticorrosive coating composition according to any one of the [1] to [7], wherein the composition comprises the amide wax (c) in an amount of from 0.05 to 15 parts by weight (a nonvolatile content) with respect to 100 parts by weight of a nonvolatile content in the anticorrosive coating composition.

[9] The anticorrosive coating composition according to any one of the [1] to [8], further comprising a silane coupling agent (e).

[10] The anticorrosive coating composition according to any one of the [1] to [9], further comprising an extender pigment (f).

[11] The anticorrosive coating composition according to the [10], wherein the extender pigment (f) includes at least a flaky pigment (g).

[12] An anticorrosive coating film formed from the anticorrosive coating composition according to any one of the [1] to [11].

[13] A method for preventing corrosion of a substrate, comprising a step of coating the substrate with the anticorrosive coating composition according to any one of the [1] to [11].

Advantageous Effects of Invention

The present invention can provide an anticorrosive coating composition that is excellent in adhesion to a substrate and anticorrosive properties and whose spray dust hardly reduces the adhesion of a film formed thereon to an object to be coated even when the spray dust has attached to the object to be coated.

BRIEF DESCRIPTION OF DRAWINGS

FIG. 1 is a schematic view for explaining an adhesion test in Examples.

DESCRIPTION OF EMBODIMENTS

<<Anticorrosive Coating Composition>>

An anticorrosive coating composition of the present invention (hereinafter also referred to simply as "composition of the present invention") comprises an epoxy resin (a), a curing agent (b), amide wax (c), and a liquid acrylic polymer (d) including a structural unit derived from an acrylate having an alkyl group of 4 to 18 carbon atoms.

Since the composition of the present invention comprises these (a) to (d), it is an anticorrosive coating composition that is excellent in adhesion to a substrate and anticorrosive properties and whose spray dust hardly reduces the adhesion of a film formed thereon to an object to be coated even when the spray dust has attached to the object to be coated.

Therefore, the composition of the present invention is suitably used for use in the formation of a thick film having a thickness of about 100 μm or more, used for ship structures such as a ballast tank, used for spray coating and used as a coating composition under conditions in which spray dust of the composition of the invention attaches.

The conditions in which spray dust of the composition of the invention attaches are not particularly limited as long as the conditions are those as below where spray dust is formed from the composition of the present invention.

Specific examples of such conditions include conditions in which during spray coating of the coating composition, the coating composition attaches to a part different from a part currently being coated (a part desired to be coated), and more specifically, conditions in which in the spray coating of a large-sized steel structure such as a ship, a land structure, or a bridge, there is a part to be coated on a floor surface or the like located at a distance of 1 m or more below from a position of the spray coating, and environmental conditions of coating in which a solvent that can be contained in the composition readily evaporates such as a temperature ranging from 10 to 40° C. and a humidity of 85% or less.

The term "spray dust" in the present invention means a coating composition dried after having attached to a part different from a part currently being coated (a part desired to be coated) during spray coating with a coating composition, for example, onto a floor surface or the like during the coating of a wall surface and a ceiling surface. Such spray dust usually attaches to a part distant to some extent from a part currently being coated (a part desired to be coated) in spray coating with a coating composition.

In addition, spray dust causing reduction in the adhesion of a film to an object to be coated tends to occur in the use of an anticorrosive coating composition that is required to form a thick film. This seems to be due to the fact that it is necessary for an anticorrosive coating composition required to form a thick film not to sag by itself in the formation of the thick film, namely, to have excellent adhesion to a substrate, and in order to meet the need, the composition includes amide wax as an anti-sagging and anti-settling agent (a thixotropic agent).

In addition, in the present invention, the term "coating film" means a film that is undried or not completely dried after applying the anticorrosive coating composition; the term "anticorrosive coating film" means a film that has been dried and cured after applying the anticorrosive coating composition; and the term "film" means a film (whether dried or undried) formed from a coating composition (including an anticorrosive coating composition).

Additionally, in the present invention, the term "double coating" means that after applying the composition of the present invention to form a coating film, the film is dried and cured as needed, and additionally, the same composition is applied thereon; and the term "top coating" means that applying a composition different from the composition of the formed the anticorrosive coating film of the invention on the film.

From viewpoints such as preservation stability, the composition of the present invention is preferably a two-component type composition prepared by mixing a main agent component and a curing agent component.

<Epoxy Resin (a)>

The epoxy resin (a) is not particularly limited, and examples of the epoxy resin (a) include non-tar-based epoxy resins described in JP-A-H11-343454 and JP-A-H10-259351.

Examples of the epoxy resin (a) include polymers or oligomers containing two or more epoxy groups in molecules thereof and polymers or oligomers produced by ring-opening reactions of the epoxy groups. Examples of such epoxy resins include bisphenol epoxy resins, glycidyl ester epoxy resins, glycidyl amine epoxy resins, phenol novolac epoxy resins, cresol epoxy resins, dimer acid-modified epoxy resins, aliphatic epoxy resins, alicyclic epoxy resins, and epoxidized oil-based epoxy resins.

Among them, from viewpoints such as that there can be obtained an anticorrosive coating film having excellent adhesion to a substrate, preferred are bisphenol epoxy resins, more preferred are bisphenol A-type and bisphenol F-type epoxy resins, and particularly preferred are bisphenol A-type epoxy resins.

Examples of such epoxy resins (a) include epichlorohydrin-bisphenol A epoxy resins (bisphenol A diglycidyl ether type); epichlorohydrin-bisphenol AD epoxy resins; bisphenol F-type epoxy resins obtained from epichlorohydrin and bisphenol F(4,4'-methylene bisphenol); epoxy novolac resins; alicyclic epoxy resins obtained from 3,4-epoxyphenoxy-3',4'-epoxyphenyl carboxy methane and the like; brominated epoxy resins in which at least one of hydrogen atoms bonded to a benzene ring in an epichlorohydrin-bisphenol A epoxy resin is substituted with a bromine atom; aliphatic epoxy resins obtained from epichlorohydrin and aliphatic dihydric alcohol; and multifunctional epoxy resins obtained from epichlorohydrin and tri(hydroxyphenyl)methane.

Examples of bisphenol A-type epoxy resins that are particularly preferably used include polycondensates of bisphenol A-type diglycidyl ethers, such as bisphenol A diglycidyl ether, bisphenol A polypropylene oxide diglycidyl ether, bisphenol A ethylene oxide diglycidyl ether, hydrogenated bisphenol A diglycidyl ether, and hydrogenated bisphenol A propylene oxide diglycidyl ether.

The epoxy resin (a) may be obtained by synthesizing using a conventionally known method or may be a commercially available product.

Examples of commercially available products that are liquid under room temperature include "E028" (a bisphenol A diglycidyl ether resin manufactured by Ohtake-Meishin Chemical Co., Ltd., epoxy equivalent: from 180 to 190, viscosity: from 12,000 to 15,000 mPa·s/25° C.), "jER-807" (a bisphenol F diglycidyl ether resin manufactured by Mitsubishi Chemical Corporation, epoxy equivalent: from 160 to 175, viscosity: from 3,000 to 4,500 mPa·s/25° C.), "FLEP 60" (manufactured by Toray Fine Chemicals Co. Ltd., epoxy equivalent: about 280, viscosity: about 17,000 mPa·s/25° C.), "E-028-90X" (a xylene solution of a bisphenol A diglycidyl ether resin (a 828 type epoxy resin solution) manufactured by Ohtake-Meishin Chemical Co., Ltd., epoxy equivalent: about 210).

Examples thereof that are semi-solid under room temperature include "jER-834" (a bisphenol A-type epoxy resin manufactured by Mitsubishi Chemical Corporation, epoxy equivalent: from 230 to 270), and "E-834-85X" (a xylene solution of a bisphenol A-type epoxy resin (a 834 type epoxy resin solution) manufactured by Ohtake-Meishin Chemical Co., Ltd., epoxy equivalent: about 300).

Examples thereof that are solid under room temperature include "jER 1001" (a bisphenol A-type epoxy resin manufactured by Mitsubishi Chemical Corporation, epoxy equivalent: from 450 to 500) and "E-001-75" (a xylene solution of a bisphenol A-type epoxy resin (a 1001 type epoxy resin solution) manufactured by Ohtake-Meishin Chemical Co., Ltd., epoxy equivalent: about 630).

The epoxy resin (a) may be used as one kind alone or in combination of two or more kinds.

The epoxy resin (a) is preferably liquid or semi-solid under room temperature (a temperature of from 15 to 25° C.; hereinafter the same shall apply), from viewpoints such as that there can be obtained a composition having excellent adhesion to a substrate.

The epoxy resin (a) has an epoxy equivalent of preferably from 150 to 1000, more preferably from 150 to 600, and particularly preferably from 180 to 500, from viewpoints such as anticorrosive properties.

A weight-average molecular weight of the epoxy resin (a) measured by GPC (gel permeation chromatograph) is preferably from 350 to 20,000, although the weight-average molecular weight thereof varies depending on coating and curing conditions for the composition to be obtained (examples: ordinary temperature drying coating or baked coating) and the like and thus it is not determined unconditionally.

The composition of the present invention includes the epoxy resin (a) in an amount of preferably from 5 to 40% by weight and more preferably from 10 to 30% by weight.

In addition, when the composition of the present invention is a two-component type composition comprising a main agent component and a curing agent component, the epoxy resin (a) is included in the main agent component and is desirably included therein in an amount of preferably from 5 to 80% by weight, and more preferably from 5 to 50% by weight.

<Curing Agent (b)>

The curing agent (b) is not particularly limited and examples of the curing agent (b) include amine-based curing agents and acid anhydride-based curing agents. Preferred are amine curing agents, such as aliphatic, alicyclic, aromatic, and heterocyclic amine curing agents.

Examples of the aliphatic amine curing agents include alkylene polyamine and polyalkylene polyamine.

Examples of the alkylene polyamine include compounds represented by a formula: $H_2N—R^1—NH_2$ ($R^1$ represents a divalent hydrocarbon group of 1 to 12 carbon atoms, and an arbitrary hydrogen atom of the hydrocarbon group may be substituted with a hydrocarbon group of 1 to 10 carbon atoms). Specific examples of such compounds include methylene diamine, ethylene diamine, 1,2-diaminopropane, 1,3-diaminopropane, 1,4-diaminobutane 1,5-diaminopentane, 1,6-diaminohexane, 1,7-diaminoheptane, 1,8-diaminooctane, 1,9-diaminononane, 1,10-diaminodecane, and trimethyl hexamethylene diamine.

Examples of the polyalkylene polyamine include compounds represented by a formula: $H_2N—(C_mH_{2m}NH)_n$ (m represents an integer of from 1 to 10, and n represents an integer of from 2 to 10, and preferably from 2 to 6). Specific examples of such compounds include diethylene triamine, dipropylene triamine, triethylene tetramine, tripropylene tetramine, tetraethylene pentamine, tetrapropylene pentamine, pentaethylenehexamine, and nonaethylene decamine.

Examples of aliphatic amine curing agents other than these include tetra(aminomethyl)methane, tetrakis(2-aminoethylaminomethyl)methane, 1,3-bis(2'-aminoethylamino) propane, triethylene-bis(trimethylene)hexamine, bis(3-aminoethyl)amine, bis(hexamethylene)triamine, and bis (cyanoethyl)diethylene triamine.

Specific examples of the alicyclic amine curing agents include 1,4-cyclohexanediamine, 4,4'-methylenebiscyclohexylamine, 4,4'-isopropylidenebiscyclohexylamine, norbornanediamine, bis(aminomethyl)cyclohexane, diaminodicyclohexylmethane, isophoronediamine, and menthenediamine (MDA).

Examples of the aromatic amine curing agents include bis(aminoalkyl)benzene, bis(aminoalkyl)naphthalene, and aromatic polyamine compounds containing two or more primary amino groups bound to benzene ring.

More specific examples of the aromatic amine curing agents include o-xylylenediamine, m-xylylenediamine (MXDA), p-xylylenediamine, phenylenediamine, napthylenediamine, diaminodiphenylmethane, diaminodiethylphenylmethane, 2,2-bis(4-aminophenyl)propane, 4,4'-diaminodiphenylether, 4,4'-diaminobenzophenone, 4,4'-diaminodiphenylether, 4,4'-diaminodiphenylsulfone, 2,2'-dimethyl-4,4'-diaminodiphenylmethane, 2,4'-diaminobiphenyl, 2,3'-dimethyl-4,4'-diaminobiphenyl, 3,3'-dimethoxy-4,4'-diaminobiphenyl, bis(aminomethyl)naphthalene, and bis(aminoethyl)naphthalene.

Specific examples of the heterocyclic amine curing agents include N-methylpiperazine, morpholine, 1,4-bis-(3-aminopropyl)-piperazine, piperazine-1,4-diazacycloheptane, 1-(2'-aminoethylpiperazine), 1-[2'-(2"-aminoethylamino)ethyl]piperazine, 1,11-diazacycloeicosane, and 1,15-diazacyclooctacosane.

Other examples of the amine curing agents that can be used include amines (amine compounds) mentioned in JP-B-S49-48480.

Still other examples of the amine curing agents include diethylaminopropylamine and polyether diamine.

Furthermore, additional examples of the amine curing agents include modified products of the above-mentioned amine curing agents, such as polyamide, polyamideamine (polyamide resin), amine adducts with epoxy compound, Mannich compounds (example: Mannich-modified polyamideamine), Michael adducts, ketimine, aldimine, and phenalkamine.

The curing agent (b) may be obtained by synthesizing using a conventionally known method or may be a commercially available product.

Examples of the commercially available product include an aliphatic polyamine: "ACI HARDNER K-39" (manufactured by PTI JAPAN Corporation), polyamideamines: "PA-66", "PA-23", and "PA-290(A)" (all of which are manufactured by Ohtake-Meishin Chemical Co., Ltd.), a modified polyamine: "MAD-204(A)" (manufactured by Ohtake-Meishin Chemical Co., Ltd.), a Mannich-modified polyamideamine: "ADEKA HARDNER EH-342W3" (manufactured by ADEKA Co., Ltd.), a Mannich-modified aliphatic polyamine: "SUNMIDE CX-1154" (manufactured by Sanwa Chemical Industry Co., Ltd.), and a phenalkamine adduct: "CARDOLITE NC556X80" (manufactured by Cardolite Corporation).

Examples of the acid anhydride-based curing agents include phthalic anhydride, tetrahydrophthalic anhydride, methyltetrahydrophthalic anhydride, 3,6-endomethylene tetrahydrophthalic anhydride, hexachloroendomethylene tetrahydrophthalic anhydride, and methyl-3,6-endomethylene tetrahydrophthalic anhydride.

The curing agent (b) may be used as one kind alone or in combination of two or more kinds.

The amine curing agent has an active hydrogen equivalent of preferably from 50 to 1000 and more preferably from 80 to 400, from viewpoints such as anticorrosive properties.

In the composition of the present invention, the curing agent (b) and the epoxy resin (a) are preferably used in such amounts that an equivalent ratio therebetween (an amount of the curing agent used/an active hydrogen equivalent)/(an amount of the epoxy resin used/epoxy equivalent) is preferably from 0.3 to 1.5 and more preferably from 0.5 to 1.0.

When the composition of the present invention is a two-component type composition comprising a main agent component and a curing agent component, the curing agent (b) is included in the curing agent component. The curing agent component is preferably prepared so as to have a nonvolatile content (a solid content) of from 50 to 100%. In this case, a viscosity of the curing agent component measured by an E-type viscometer is preferably 100000 mPa·s/25° C. or less and more preferably from 50 to 10000 mPa·s/25° C., from viewpoints such as that excellent handleability and coatability.

<Amide Wax (c)>

The amide wax (c) is not particularly limited and examples of the amide wax (c) include amide waxes synthesized from vegetable oil fatty acids and amines.

Such an amide wax (c) may be obtained by synthesizing using a conventionally known method or may be a commercially available product.

Examples of the commercially available product include "DISPARLON A630-20X" and "DISPARLON 6650" manufactured by Kusumoto Chemicals, Ltd., and "ASA T-250F" manufactured by Itoh Oil Chemicals Co., Ltd.

The amide wax (c) may be used as one kind alone or in combination of two or more kinds.

As the results of diligent research, the present inventors found that spray dust formed from the conventional anticorrosive coating compositions including fatty acid amide wax causes reduction in the adhesion of a film formed thereon to an object to be coated.

Accordingly, when considering only the inhibition of reduction in the adhesion of the film formed on the spray dust-attached surface to the object to be coated, the composition of the present invention preferably does not include the amide wax (c). However, when the composition of the present invention is used for purposes requiring anticorrosive properties, particularly, for steel structures forming ships, an anticorrosive coating film to be formed is required to have a thickness of about 100 μm or more. When forming an anticorrosive coating film having such a thickness, for example, on wall surface and ceiling surface substrates, it is necessary that the composition does not sag during coating, in other words, the composition should be excellent in adhesion to the substrates.

Herein, it is preferable to use amide wax from viewpoints such as its excellent anti-sagging effect, although various compounds have been conventionally known to be used as an anti-sagging and anti-settling agent (a thixotropic agent) in order to improve adhesion of such a coating composition to a substrate.

Taking all described above into consideration, the amide wax (c) in the composition of the present invention has a content (a nonvolatile content) of preferably from 0.05 to 15 parts by weight, more preferably from 0.3 to 5 parts by weight, and still more preferably from 0.5 to 3 parts by weight, with respect to 100 parts by weight of the nonvolatile content in the composition of the present invention.

<Liquid Acrylic Polymer (d)>

The liquid acrylic polymer (d) includes a structural unit derived from an acrylate having an alkyl group of 4 to 18 carbon atoms.

Since the composition of the present invention includes such a liquid acrylic polymer (d), spray dust occurring from the composition of the invention hardly reduces the adhesion of a film formed thereon to an object to be coated, even when the composition includes amide wax.

Therefore, the composition of the present invention has well-balanced excellence in anticorrosive properties, adhesion to a substrate (particularly, anti-sagging properties), and the properties in which spray dust of the composition hardly reduces the adhesion of a film formed thereon to an object to be coated even when the spray dust has attached to the object to be coated.

The composition of the present invention exhibiting the above advantageous effects can be obtained by using the liquid acrylic polymer (d) that is neither solid nor semi-solid, but liquid under room temperature; that is a polymer whose main raw material is not methacrylate but acrylate; and that is not a polymer including no structural unit derived from an acrylate having an alkyl group of 4 to 18 carbon atoms but a polymer including a structural unit derived from an acrylate having an alkyl group of 4 to 18 carbon atoms.

Examples of the liquid acrylic polymer (d) include homopolymers or copolymers of acrylates having an alkyl group of 4 to 18 carbon atoms, such as n-butyl acrylate, iso-butyl acrylate, tert-butyl acrylate, 2-ethylhexyl acrylate, hexyl acrylate, heptyl acrylate, n-octyl acrylate, isooctyl acrylate, n-nonyl acrylate, isononyl acrylate, decyl acrylate, lauryl acrylate, tridecyl acrylate, and stearyl acrylate.

The liquid acrylic polymer (d) may be a copolymer of the acrylate having an alkyl group of 4 to 18 carbon atoms and other(s) monomer capable of polymerization with the acrylate.

Examples of the other monomer capable of polymerization with the acrylate having an alkyl group of 4 to 18 carbon atoms include (meth)acrylic acid ester monomers such as methyl (meth)acrylate, ethyl (meth)acrylate, 2-methoxyethyl (meth)acrylate, 2-ethoxyethyl (meth)acrylate, phenoxyethyl (meth)acrylate, 2-(2-ethylhexaoxyl)ethyl (meth)acrylate, 1-methyl-2-methoxyethyl (meth)acrylate, 3-methoxybutyl (meth)acrylate, 3-methyl-3-methoxybutyl (meth)acrylate, m-methoxyphenyl (meth)acrylate, p-methoxyphenyl (meth)acrylate, o-methoxyphenyl ethyl (meth)acrylate, m-methoxyphenyl ethyl (meth)acrylate, p-methoxyphenyl ethyl (meth)acrylate, n-propyl (meth)acrylate, iso-propyl (meth)acrylate, n-butyl methacrylate, iso-butyl methacrylate, tert-butyl methacrylate, 2-ethylhexyl methacrylate, lauryl methacrylate, stearyl methacrylate, benzyl (meth)acrylate, phenyl (meth)acrylate, isobornyl (meth)acrylate, cyclohexyl (meth)acrylate, glycidyl (meth)acrylate, dicyclopentenyl (meth)acrylate, and 2-dicyclopentenoxy ethyl (meth)acrylate; hydroxyl group-containing monomers such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate; adducts of 2-hydroxyethyl (meth)acrylate and ethylene oxide, propylene oxide, γ-butyrolactone, ε-caprolactone, or the like; dimers or trimers of 2-hydroxyethyl (meth)acrylate, 2-hydroxypropyl (meth)acrylate, or the like; monomers having a plurality of hydroxyl groups such as glycerol (meth)acrylates; primary or secondary amino group-containing vinyl monomers such as buthylaminoethyl (meth)acrylate and (meth)acrylamide; tertiary amino group-containing vinyl monomers such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylamide, and dimethylaminopropyl (meth)acrylamide; heterocyclic-based basic monomers such as vinylpyrrolidone, vinylpyridine, and vinylcarbazole; and vinyl-based monomers such as stylene, vinyl toluene, α-methyl stylene, (meth)acrylonitrile, vinyl acetate, and vinyl propionate.

An acrylate having an alkyl group of 4 to 18 carbon atoms and other(s) monomer used in a copolymer of the acrylate and other(s) monomer capable of polymerization with the acrylate, respectively, can be used by selecting only one kind or a combination of two or more kinds as needed.

When the liquid acrylic polymer (d) is a copolymer of the acrylate having an alkyl group of 4 to 18 carbon atoms and other(s) monomer capable of polymerization with the acrylate, the term "acrylic polymer" means a polymer obtained by using an acrylate, as a synthetic raw material monomer of the copolymer, in an amount of 55% by weight or more, preferably 70% by weight or more, and still more preferably 80% by weight or more with respect to 100% by weight of the synthetic raw material monomer.

The alkyl group of 4 to 18 carbon atoms is preferably an alkyl group of 4 to 12 carbon atoms and more preferably an alkyl group of 4 to 8 carbon atoms, from viewpoints such as that there can be obtained a composition having well-balanced excellence in adhesion to a substrate (particularly, anti-sagging properties) and the properties in which spray dust of the composition hardly reduces the adhesion of a film formed thereon to an object to be coated even when the spray dust has attached to the object to be coated.

The liquid acrylic polymer (d) includes preferably a structural unit derived from an acrylate having an alkyl group of 4 to 18 carbon atoms having a branched structure, preferably a structural unit derived from an acrylate having an alkyl group of 4 to 12 carbon atoms having a branched structure, more preferably a structural unit derived from isobutyl acrylate or 2-ethylhexyl acrylate, particularly preferably a structural unit derived from isobutyl acrylate or 2-ethylhexyl acrylate and a structural unit derived from n-butyl acrylate, and particularly preferably a structural unit derived from isobutyl acrylate and n-butyl acrylate or a structural unit derived from 2-ethylhexyl acrylate, from viewpoints such as that there can be obtained a composition having well-balanced excellence in adhesion to a substrate and the properties in which spray dust of the composition hardly reduces the adhesion of a film formed thereon to an object to be coated even when the spray dust has attached to the object to be coated.

When the liquid acrylic polymer (d) includes a structural unit derived from an acrylate having an alkyl group of 4 to 18 carbon atoms having a branched structure, the liquid acrylic polymer (d) includes a structural unit derived from an acrylate having an alkyl group of 4 to 18 carbon atoms having a branched structure in an amount of preferably from 30 to 100% by weight, more preferably from 40 to 100% by weight, and particularly preferably from 50 to 100% by weight with respect to a total 100% by weight of the liquid acrylic polymer (d), from viewpoints such as that there can be obtained a composition that is excellent in adhesion to a substrate and anticorrosive properties and whose spray dust hardly reduces the adhesion of a film formed thereon to the object to be coated even when the spray dust has attached to the object to be coated. In addition, due to the same reasons, the liquid acrylic polymer (d) includes a structural unit derived from isobutyl acrylate or 2-ethylhexyl acrylate in an amount of preferably from 30 to 100% by weight, more preferably from 40 to 100% by weight, and particularly preferably from 45 to 100% by weight.

In addition, when the liquid acrylic polymer (d) includes a structural unit (i) derived from isobutyl acrylate or 2-ethylhexyl acrylate and a structural unit (ii) derived from n-butyl acrylate, the liquid acrylic polymer (d) preferably includes the structural units (i) and (ii) such that a total of the structural units (i) and (ii) is preferably from 30 to 100% by weight, more preferably from 50 to 100% by weight, and particularly preferably from 75 to 100% by weight with respect to the total 100% by weight of the liquid acrylic polymer (d) and such that a ratio of the structural unit (i) to the structural unit (ii) (the structural unit (i): the structural unit (ii)) is preferably from 10:90 to 99:1 and more preferably from 10:90 to 90:10 (provided that the total of the structural units (i) and (ii) is 100), from viewpoints such as that there can be obtained a composition that is excellent in adhesion to a substrate and anticorrosive properties and whose spray dust hardly reduces the adhesion of a film formed thereon to an object to be coated even when the spray dust has attached to the object to be coated.

The liquid acrylic polymer (d) has a glass transition temperature of preferably 0° C. or less and more preferably −30° C. or less, from viewpoints such as that there can be obtained a composition whose spray dust hardly reduces the adhesion of a film formed thereon to an object to be coated even when the spray dust has attached to the object to be coated.

Such a glass transition temperature can be measured by DSC (a differential scanning calorimeter).

A weight-average molecular weight of the liquid acrylic polymer (d) measured by GPC is preferably from 1000 to 100000 and more preferably from 1000 to 30000, from viewpoints such as that there can be obtained a composition that is excellent in adhesion to a substrate and whose spray dust hardly reduces the adhesion of a film formed thereon to an object to be coated even when the spray dust has attached to the object to be coated.

A viscosity of an acrylic polymer solution prepared by diluting the liquid acrylic polymer (d) with an equivalent weight of butyl acetate, measured by an E-type viscometer, varies depending on an average molecular weight of the polymer. The viscosity thereof is preferably from 5 to 3000 mPa·s/25° C. and more preferably from 5 to 300 mPa·s/25° C., from viewpoints such as that there can be obtained a composition that is excellent in adhesion to a substrate and whose spray dust hardly reduces the adhesion of a film formed thereon to the object to be coated even when the spray dust has attached to the object to be coated.

The liquid acrylic polymer (d) may be obtained by synthesizing using a conventionally known method or may be a commercially available product.

The liquid acrylic polymer (d) can be synthesized by reacting the acrylate having an alkyl group of 4 to 18 carbon atoms with other(s) monomer used as needed, and if needed adding an additive such as a polymerization initiator, in the presence of an organic solvent under heating at from 30 to 180° C. for from 2 to 18 hours.

In this reaction, the monomer to be used in the reaction is preferably used in such an amount that the obtained liquid acrylic polymer (d) includes a structural unit derived from the monomer in an amount within the above range.

The organic solvent is not particularly limited. Examples of the organic solvent include aromatic hydrocarbon-based solvents such as toluene and xylene, ketone-based solvents such as methyl ethyl ketone and methyl isobutyl ketone, ester-based solvents such as butyl acetate, alcohol-based solvents such as isopropanol, and aliphatic hydrocarbon-based solvents such as mineral spirit, n-hexane, n-octane, 2,2,2-trimethylpentane, isooctane, n-nonane, cyclohexane, and methylcyclohexane.

These may be used as one kind alone or in combination of two or more kinds.

In the composition of the present invention, a varnish including the liquid acrylic polymer (d) obtained in the above reaction may be used as it is, or a resultant obtained by removing the polymerization initiator from the varnish may be used. Accordingly, as the organic solvent, it is preferable to use the same compound as any of solvents below that can be used in the composition of the present invention.

The polymerization initiator is not particularly limited. Examples of the polymerization initiator that can be used include azo-based initiators such as azobisisobutyronitrile, 2,2-azobis(2-methylbutyronitrile), 2,2-azobis(2-methylpropionitrile), 2,2-azobis(2,4-dimethylvaleronitrile) and peroxide-based initiators such as benzoyl peroxide, t-butyl peroxyoctanoate, diisobutyl peroxide, di-(2-ethylhexyl) peroxypivalate, decanoyl peroxide, t-butylperoxy-2-ethylhexanoate, and t-butylperoxy benzoate.

These may be used as one kind alone or in combination of two or more kinds.

The liquid acrylic polymer (d) in the composition of the present invention has a content (a nonvolatile content) of preferably from 0.01 to 5 parts by weight, more preferably from 0.03 to 5 parts by weight, and still more preferably from 0.05 to 2 parts by weight with respect to 100 parts by weight of the nonvolatile content in the composition of the invention.

When the composition of the present invention includes the liquid acrylic polymer (d) in such an amount, spray dust formed from the composition hardly reduces the adhesion of a film formed thereon to an object to be coated, although amide wax is included in the composition.

<Other Components>

The composition of the present invention may include, in addition to the (a) to (d), a silane coupling agent (e), an extender pigment (f), a coloring pigment, an anti-sagging and anti-settling agent, a solvent, a plasticizer, a curing accelerator, an inorganic dehydrating agent (a stabilizer), a defoaming agent, an antifouling agent, and/or the like, as needed, as long as the object of the invention is not impaired.

The other components mentioned above are not limited as long as they are conventionally known ones that are used in anticorrosive coating compositions.

<Silane Coupling Agent (e)>

The use of the silane coupling agent (e) can further improve not only the adhesion of an obtained anticorrosive coating film to a substrate, but also can improve anticorrosive properties of the obtained anticorrosive coating film, such as salt water resistance. Thus, the composition of the present invention preferably comprises the silane coupling agent (e).

Such a silane coupling agent may be used as one kind alone or in combination of two or more kinds.

The silane coupling agent (e) is not particularly limited and can be a conventionally known one. The silane coupling agent (e) is preferably a compound that contains at least two functional groups in one molecule and can contribute to improvement in adhesion to a substrate, reduction in the viscosity of the composition, and the like, and more preferably a compound represented by a formula: X—Si(OR)$_3$ [X represents a functional group capable of reacting with an organic substance (such as an amino group, a vinyl group, an epoxy group, a mercapto group, a halo group, or a hydrocarbon group containing any of these groups, in which the hydrocarbon group may have an ether bond and/or the like) or represents an alkyl group; and OR represents a hydrolyzable group (such as a methoxy group or an ethoxy group)].

Specific examples of the preferable silane coupling agents include "KBM 403" (γ-glycidoxypropyltrimethoxysilane manufactured by Shin-Etsu Chemical Co., Ltd.) and "SILA-ACE S-510" (manufactured by JNC Corporation).

When the silane coupling agent (e) is mixed in the composition of the present invention, an amount of the silane coupling agent (e) to be mixed is preferably from 0.1 to 10 parts by weight and more preferably from 0.3 to 5 parts by weight with respect to 100 parts by weight of the composition of the invention. The use of the composition including the silane coupling agent (e) in such an amount can improve the performances of an anticorrosive coating film such as adhesion to a substrate, and can reduce the viscosity of the composition of the invention, thus improving coating workability.

<Extender Pigment (f)>

The use of the extender pigment (f) can not only be cost-effective for a composition to be obtained, but also can lead to the formation of an anticorrosive coating film excellent in anticorrosive properties, salt water resistance, high temperature and high humidity resistance, and the like. Therefore, the composition of the present invention preferably comprises the extender pigment (f).

Specific examples of the extender pigment (f) include barium sulphate, potassium feldspar, barite powder, silica, calcium carbonate, talc, mica, and glass flake.

Such an extender pigment (f) may be used as one kind alone or in combination of two or more kinds.

The composition of the present invention preferably comprises at least a flaky pigment (g) as the extender pigment (f), from viewpoints such as that there can be formed an anticorrosive coating film excellent in anticorrosive properties, salt water resistance, high temperature and high humidity resistance, and the like.

Examples of such a flaky pigment (g) include mica and glass flake. Mica is preferable from viewpoints such as that it is easily available at low cost and there can be formed an anticorrosive coating film more excellent in terms of the above-mentioned effects.

The flaky pigment (g) may be used as one kind alone or in combination of two or more kinds.

The mica is preferably mica having a high aspect ratio of from 30 to 90, from viewpoints such as improvement in blistering resistance, reduction in creeping properties, and relaxation of internal stress in an anticorrosive coating film to be obtained. Examples of such mica having a high aspect ratio include "SUZORITE MICA 200HK" (manufactured by Kuraray Trading Co., Ltd., aspect ratio: from 40 to 60).

When the extender pigment (f) is mixed in the composition of the present invention, an amount of the extender pigment (f) to be mixed is preferably from 5 to 80 parts by weight and more preferably from 10 to 70 parts by weight with respect to 100 parts by weight of the nonvolatile content of the composition of the invention.

In addition, an amount of the flaky pigment (g) to be mixed is preferably from 1 to 40 parts by weight and more preferably from 3 to 20 parts by weight with respect to 100 parts by weight of the nonvolatile content of the composition of the present invention, from viewpoints such as improvement in the performances of an anticorrosive coating film, such as water-resistant and anticorrosive properties and bending resistance.

<Coloring Pigment>

Examples of the coloring pigment include titanium white, red iron oxide, yellow iron oxide, and carbon black.

The coloring pigment may be used as one kind alone or in combination of two or more kinds.

When the coloring agent is mixed in the composition of the present invention, an amount of the coloring agent to be mixed is preferably from 0.1 to 15 parts by weight and more preferably from 0.5 to 10 parts by weight with respect to 100 parts by weight of the nonvolatile content of the composition of the invention.

In addition, the extender pigment and the coloring pigment are preferably included in the composition of the present invention in such amounts that an anticorrosive coating film formed from the composition of the present invention has a pigment volume concentration (PVC: a volume concentration of the extender pigment (E) and the coloring pigment in the anticorrosive coating film) of preferably from 10 to 75% by weight and preferably from 25 to 50% by weight, from viewpoints such as anticorrosive properties.

<Anti-Sagging and Anti-Settling Agent>

The anti-sagging and anti-settling agent (a compound other than the amide wax (c)) can provide thixotropy to the composition of the present invention to improve the adhesion of the composition to a substrate. Although the amide wax (c) is also an anti-sagging and anti-settling agent, the composition of the present invention may further comprise an anti-sagging and anti-settling agent as needed.

The anti-sagging and anti-settling agent is not particularly limited and examples thereof include organic thixotropic agents and inorganic thixotropic agents.

The anti-sagging and anti-settling agent may be used as one kind alone or in combination of two or more kinds.

Examples of the organic thixotropic agents include hydrogenated castor oil-based, oxidized polyethylene-based, vegetable oil polymerized oil-based, and surfactant-based thixotropic agents and thixotropic agents as combinations of two or more kinds thereof.

In addition, examples of the inorganic thixotropic agents include fine powdered silica, bentonite, silica surface-treated with a silane compound or the like, bentonite surface-treated with quaternary ammonium salt or the like (organic bentonite), ultrafine surface-treated calcium carbonate, and mixtures thereof. Specific examples of the inorganic thixotropic agents include silica fine powder obtained by micronization by a drying method [for example, product name: AEROSIL 300 manufactured by Nippon Aerosil Co., Ltd.], fine powder obtained by modifying silica fine powder with hexamethyldisilazane [for example, product name: AEROSIL RX300 manufactured by Nippon Aerosil Co., Ltd.], fine powder obtained by modifying silica fine powder with polydimethylsiloxane [for example, product name: AEROSIL RY300 manufactured by Nippon Aerosil Co., Ltd.], hydrophobic fine powdered silica obtained by modifying silica fine powder with dimethyldichlorosilane [for example, product name: AEROSIL R972 manufactured by Nippon Aerosil Co., Ltd.], and organic bentonite (product name: BENTONE SD-2 manufactured by Elementis Specialties, Inc).

Among them, a combination of a silica surface-treated with a silane compound or the like and a bentonite surface-treated with quaternary ammonium salt or the like is preferably used as the anti-sagging and anti-settling agent, from viewpoints such as that there can be obtained a composition excellent in adhesion to a substrate.

When the anti-sagging and anti-settling agent is mixed in the composition of the present invention, an amount of the anti-sagging and anti-settling agent to be mixed is preferably from 0.1 to 5 parts by weight and more preferably from 0.3 to 2 parts by weight with respect to 100 parts by weight of the nonvolatile content of the composition of the invention, from viewpoints such as that there can be obtained a composition excellent in coating material viscosity, coating workability, and storage stability.

In addition, in the composition of the present invention, a total content of the amide wax (c) and the anti-sagging and anti-settling agent is preferably from 0.3 to 6 parts by weight and more preferably from 0.5 to 3 parts by weight with respect to 100 parts by weight of the nonvolatile content of the composition of the invention, from viewpoints such as that there can be obtained a composition having well-balanced excellence, for example, in anti-sagging properties and the properties in which spray dust of the composition hardly reduces the adhesion of a film formed thereon to an object to be coated even when the spray dust has attached to the object to be coated.

Additionally, in this case, the amide wax (c) and the anti-sagging and anti-settling agent are desirably included such that a mass ratio between the contents of the amide wax (c) and the anti-sagging and anti-settling agent (the content of the amide wax (c): the content of the anti-sagging and anti-settling agent) in the composition of the present invention is preferably from 10:90 to 90:10 and more preferably from 15:85 to 85:15 (provided that the total content of the amide wax (c) and the anti-sagging and anti-settling agent is 100).

<Solvent>

The solvent is not particularly limited and can be used a conventionally known one. Examples of known solvents that can be used include xylene, toluene, methyl isobutyl ketone, methoxypropanol, methyl ethyl ketone, butyl acetate, butanol, isopropyl alcohol, and 1-methoxy-2-propanol.

These solvents may be used as one kind alone or in combination of two or more kinds.

When the solvent is mixed in the composition of the present invention, an amount of the solvent to be mixed is not particularly limited and can be adjusted as needed depending on a coating method used in the coating of the composition of the invention. When considering coatability and the like of the composition of the present invention, the solvent is desirably included in such an amount that the nonvolatile content of the composition of the invention has a concentration of preferably from 55 to 98% by weight and more preferably from 65 to 95% by weight.

In addition, when the composition of the present invention is spray coated, the solvent is desirably included in such an amount that the nonvolatile content of the composition of the invention has a concentration of preferably from 55 to 95% by weight and more preferably from 65 to 90% by weight, from viewpoints such as coatability.

<Plasticizer>

The composition of the present invention preferably comprises a plasticizer, from viewpoints such as improvement in flexibility and weather resistance of an anticorrosive coating film to be obtained.

The plasticizer may be used as one kind alone or in combination of two or more kinds.

The plasticizer can be selected from a wide range of conventionally known ones, and examples thereof include liquid hydrocarbon resins of low boiling point fractions or the like obtained by thermal decomposition of naphtha, petroleum resins that are solid under room temperature, xylene resins, and coumarone-indene resins. Specific examples thereof include a liquid hydrocarbon resin and a flexibility-imparting resin described in JP-A-2006-342360.

Among them, preferred are liquid hydrocarbon resins, and petroleum resins that are solid under room temperature, xylene resins and coumarone-indene resins, which contain a hydroxyl group, from viewpoints such as good compatibility with the epoxy resin (a).

Examples of commercially available products of the liquid hydrocarbon resins include "NECIRES EPX-L" and "NECIRES EPX-L2" (both of which are phenol-modified hydrocarbon resins manufactured by NEVCIN Polymers Co.), "HILENOL PL-1000S" (a liquid hydrocarbon resin manufactured by Kolon Chemical Co). Examples of commercially available products of the petroleum-based resins that are solid under room temperature include "NEO POLYMER E-100", "NEO POLYMER K-2", and "NEO POLYMER K-3" (all of which are C9-based hydrocarbon resins manufactured by Nippon Petrochemicals Co. Ltd.); examples of commercially available products of the coumarone-indene resins include "NOVARES CA 100" (manufactured by Rutgers Chemicals AG); and examples of commercially available products of the xylene resins include "NIKANOL Y-51" (manufactured by Mitsubishi Gas Chemical Company, Inc).

In the mixing of the plasticizer in the composition of the present invention, an amount of the plasticizer to be mixed is preferably from 1 to 50 parts by weight and more preferably from 3 to 30 parts by weight with respect to 100 parts by weight of the composition of the invention, from viewpoints such as that there can be obtained an anticorrosive coating film excellent in weather resistance, anti-cracking properties, and the like.

<Curing Accelerator>

The composition of the present invention preferably comprises a curing accelerator that can contribute to the adjustment of curing rate, particularly acceleration thereof.

Examples of the curing accelerator include tertiary amines.

These curing accelerators may be used as one kind alone or in combination of two or more kinds.

Specific examples of the curing accelerators include triethanol amine, dialkylaminoethanol, triethylenediamine [1,4-diazacyclo(2,2,2)octane], 2,4,6-tri(dimethylaminomethyl)phenol (examples: product name "VERSAMINE EH30" (manufactured by Henkel Hakusui Corporation) and product name: "ANCAMINE K-54" (manufactured by Air Products Japan, Inc.)). These curing accelerators are preferably included in an amount of from 0.05 to 2.0% by weight in the composition of the present invention.

<<Anticorrosive Coating Film>>

The anticorrosive coating film of the present invention is not particularly limited as long as it is a film formed from the composition of the invention. The anticorrosive coating film of the present invention is preferably a film obtained by forming a coating film from the composition of the invention applied on a substrate and then drying and curing the coating film.

Thus anticorrosive coating film has excellent anticorrosive properties such as saltwater resistance and high temperature and high humidity resistance, excellent adhesion to a substrate, and excellent properties in which spray dust of the composition hardly reduces the adhesion of a film formed thereon to an object to be coated even when the spray dust has attached to the object to be coated.

The substrate is not particularly limited but preferably a substrate for which anticorrosive properties are required, from viewpoints such as that the effects of the present invention can be further exhibited.

As such a substrate, preferred are substrates comprising steel, non-ferrous metals (such as zinc, aluminium, and stainless steel), or the like. Among structures such as ships, land structures, and bridges comprising these materials, more preferred ones are ship structures, among which a ballast tank is more preferred. The ballast tank may be one subjected to electric anticorrosion treatment by installation of an anode made of zinc, zinc-aluminium, or the like. The electric anticorrosion treatment is performed at a current density of preferably from 1 to 10 mA/m$^2$.

The substrate may be one whose surface has been treated (for example, blast treatment (ISO 8501-1 Sa2 1/2), a friction method, an oil and dust removal treatment by degreasing, and/or the like) as needed in order to remove rust, oil and fat, water, dust, slime, salt, and the like and in order to improve the adhesion of an anticorrosive coating film to be obtained. In addition, from viewpoints such as anticorrosive properties, weldability, and shearability of the substrate, the substrate may be one whose surface when needed has been coated with a coating material for thin-film formation, such as a conventionally known primary anti-rust coating material (a shop primer), another primer, or the like and then dried.

A method for applying the composition of the present invention on the substrate is not particularly limited, and a conventionally known method can be unlimitedly used. Preferred is spray coating, from viewpoints such as that it is excellent in workability, productivity, and the like; coating can be easily performed even on a substrate with a large area; and the effects of the present invention can be further exhibited.

When the composition of the present invention is a two-component type composition, a main agent component and a curing agent component may be mixed together immediately before coating and then spray coating or the like may be performed.

Conditions for the spray coating can be adjusted as needed, in accordance with the thickness of an anticorrosive coating film desired to be formed. For airless spraying, coating conditions may be set to, for example, a primary (air) pressure ranging from 0.4 to 0.8 Mpa, a secondary (coating material) pressure ranging from 10 to 26 MPa, and a gun moving speed ranging from 50 to 120 cm/second.

A method for drying and curing the coating film is not particularly limited. In order to shorten a time for drying and curing, the coating film may be dried and cured by heating at a temperature ranging from 5 to 60° C. However, usually, the coating film is dried and cured by allowing the film to stand at room temperature in the air for from 1 to 14 days.

A film thickness of the anticorrosive coating film is not particularly limited as long as the thickness can prevent the corrosion of a substrate. The film thickness thereof is preferably from 100 to 450 μm and more preferably from 250 to 400 μm.

In the formation of an anticorrosive coating film having such a film thickness, single coating may be performed to form an anticorrosive coating film having a desired thickness, or depending on the anticorrosive properties, double coating (or more than that, if needed) may be performed to form an anticorrosive coating film having a desired thickness. Preferably, double coating is performed to form an anticorrosive coating film having a thickness in the above range, from viewpoints such as that there can be formed an anticorrosive coating film having excellent anticorrosive properties.

In the case of forming the anticorrosive coating film on a ship structure such as a ballast tank as the substrate, the film is required to have a thickness of 300 μm or so. The composition of the present invention has excellent adhesion to a substrate, specifically, has excellent anti-sagging properties, thereby facilitating the formation of an anticorrosive coating film having such a thickness.

<<Method for Preventing Corrosion of Substrate>>

A method for preventing corrosion of a substrate according to the present invention is not particularly limited as long as the method includes a step of applying the composition of the invention on a substrate. Preferred is a method for preventing corrosion of a substrate in which the composition of the invention is applied on a substrate to form a coating film and then the coating film is dried and cured.

In this method, the substrate, the coating method, and the like may be the same as those described in the section of the anticorrosive coating film.

In addition, in the method for preventing corrosion of a substrate, a conventionally known top coating material such as an antifouling paint may be applied, dried, and cured on an obtained coating film or anticorrosive coating film depending on the desired purpose.

For example, a method for preventing corrosion of a ballast tank will be performed as follows:

First, the composition of the present invention is spray coated on a floor surface of the ballast tank (a first coating). Without or while drying the obtained coating film, the composition of the invention is spray coated on a wall surface and a ceiling surface. In this case, the composition which gives a spray dust through drying, attaches onto the floor surface, and then drying proceeds in a solvent atmosphere. After the coating film on the floor surface has been dried, the composition previously used is spray coated again on the floor surface (a second coating). In addition, the previously used composition is also similarly spray coated again on the wall surface and the ceiling surface, resulting in the formation of an anticorrosive coating film having a thickness of 320 μm or so on the floor surface, the wall surface, and the ceiling surface.

The above method for preventing corrosion of a ballast tank is the condition in which the spray dust tends to reduce the adhesion of a film (which is a coating film and a dried coating film obtained by the second coating) formed thereon to an object to be coated (which is a spray dust-attached dried coating film obtained by the first coating), as described above. However, the use of the composition of the present invention hardly causes such adhesion reduction.

On the other hand, the uses of the conventional anticorrosive coating compositions result in significant adhesion reduction.

EXAMPLES

Hereinafter, the present invention will be further described with reference to Examples. However, the invention is not limited thereto.

Regarding anticorrosive coating films formed from compositions obtained in Examples and Comparative Examples below, tests (1) to (6) as below were conducted. Table 2 shows the results.

(1) Salt Water Resistance Test

Salt water resistances of the anticorrosive coating films were measured based on JIS K-5600 6-1. Specifically, the measurements were conducted as follows:

Each of the compositions obtained in the Examples and Comparative Examples below was spray coated to give a dry film thickness of about 250 μm on a steel plate having a size of 150 mm×70 mm×1.6 mm (thickness) subjected to blasting treatment (hereinafter referred to also as "test plate"). The obtained test plates with the coating film were dried in an atmosphere of 23° C. and 50% RH for 7 days to produce test plates with an anticorrosive coating film. Using the test plates with the anticorrosive coating film, the appearances of the anticorrosive coating films after having been immersed in 3% salt water at 40° C. for 90 days were visually evaluated according to the following criteria:
(Evaluation Criteria)
A: There are no changes on blistering, cracking, rust, peeling, and hue.
B: There are slight defects (changes) on any of blistering, cracking, rust, peeling, and hue.
C: There are obvious changes on any of blistering, cracking, rust, peeling, and hue.

(2) Electric Anticorrosion Test

A zinc anode was connected to each of test plates with an anticorrosive coating film produced in the same manner as in the salt water resistance test to give an electric current density of 5 mA/m$^2$ or less, and then the test plates were immersed in 3% salt water at 40° C. for 90 days. After that, the appearances of the anticorrosive coating films were visually evaluated according to the following criteria:
(Evaluation Criteria)
A: There are no changes on blistering, cracking, rust, peeling, and hue.
B: There are slight defects (changes) on any of blistering, cracking, rust, peeling, and hue.
C: There are obvious changes on any of blistering, cracking, rust, peeling, and hue.

(3) Salt Water Spray Test

Based on JIS K-5600 7-1, a solution with a salt water concentration of 5% was sprayed onto each of test plates with an anticorrosive coating film produced in the same manner as in the salt water resistance test, continuously for 90 days under a condition of 35° C. Then, the appearances of the anticorrosive coating films were visually evaluated according to the following criteria:
(Evaluation Criteria)
A: There are no changes on blistering, cracking, rust, peeling, and hue.
B: There are slight defects (changes) on any of blistering, cracking, rust, peeling, and hue.
C: There are obvious changes on any of blistering, cracking, rust, peeling, and hue.

(4) High Temperature and High Humidity Resistance Test

High temperature and high humidity resistances of anticorrosive coating films were measured based on JIS K-5600 7-2. Specifically, the measurement was conducted as follows.

Using test plates with an anticorrosive coating film produced in the same manner as in the salt water resistance test, each of the test plates was kept in a tester with a temperature of 50° C. and a humidity of 95% for 90 days. Then, the appearances of the anticorrosive coating films were evaluated according to the following criteria:
(Evaluation Criteria)
A: There are no changes on blistering, cracking, rust, peeling, and hue.
B: There are slight defects (changes) on any of blistering, cracking, rust, peeling, and hue.
C: There are obvious changes on any of blistering, cracking, rust, peeling, and hue.

(5) Second Coating Adhesion

Second coating adhesions of anticorrosive coating films were measured based on JIS K-5400 8.5.3. Specifically, the following steps were taken.

Each of the compositions obtained in the Examples and Comparative Examples below was spray coated on each test plate to give a dry film thickness of about 160 μm, whereby test plates with a coating film were obtained. The obtained test plates with the coating film were dried in an atmosphere of 23° C. and 50% RH for 1 day. Then, the same composition as that used to form the coating film was spray coated on each of the obtained test plates with the dried coating film to give a dry film thickness of about 160 μm. The resulting test plates were dried in an atmosphere of 23° C. and 50% RH for 7 days to obtain test plates with an anticorrosive coating film having a film thickness of 320 μm.

Using the obtained test plates with the anticorrosive coating film, a peeling state between the anticorrosive coating films (a peeling rate) was evaluated according to the following criteria. The evaluation will be described with reference to FIG. 1.

An X-shaped incision 2 was formed on a surface of the anticorrosive coating film 1 of each of the obtained test plates with the anticorrosive coating film. In this case, an area within a quadrangle formed by connecting four end portions of the two cuts of the incision 2 was designated as an incision-formed area 3.

After that, an adhesive cellophane tape was stuck onto the X-shaped incision and one end of the tape was peeled off at an angle close to 90 degrees with respect to the surface of the anticorrosive coating film to evaluate the peeling state between the anticorrosive coating films (a peeling rate). Visual estimation was made on a rate of the anticorrosive coating film peeled off from the test plate with respect to the incision-formed area 3 after peeling off the tape.
(Evaluation Criteria)
A: No peeling is observed.
B: Peeling rate is from 1 to 15% of the entire film.
C: Peeling rate is more than 15% of the entire film.

(6) Adhesion to Spray Dust-Attached Surface

Adhesion of anticorrosive coating films to a spray dust (dust spray)-attached surface was measured based on JIS K-5400 8.5.3. Specifically, the measurements were conducted as follows.

Test plates having a size of 150×70×1.6 (thickness) mm were placed in such a manner that surfaces thereof were substantially vertical with respect to gravity, and then coated with each of the anticorrosive coating compositions obtained in the Examples and Comparative Examples below such that an obtained anticorrosive coating film had a film thickness of 160 thereby obtaining test plates with the coating film.

A coating film surface of each of the obtained test plates with the coating film was coated with the same composition as that used to form the coating film, by spray coating from a height of 3 m above the test plate, whereby the composition which gives a spray dust through drying, was attached to about 95% or more of a surface area of the coating film. Immediately after the attachment of the composition, the obtained test plate with the composition that gives a spray dust was placed in a plastic box at a height position of 8 cm from the bottom of the box, the plastic box having an opened top part with a size of 60×40×30 (height) cm, and having 200 g of xylene sprayed on a bottom thereof. Then, the test plate was dried for 1 day.

The condition for attachment of the composition that gives a spray dust and the condition for drying after the attachment are those for recreating conditions similar to one example of conditions for attachment of spray dust that can occur when the composition of the present invention is used in a place where coating is performed.

After drying in the above atmosphere for 1 day, the same composition as that used to form the coating film was again spray coated on obtained test plates with a dried coating film to give a dry film thickness of about 160 µm. Then, the test plates were dried in an atmosphere of 23° C. and 50% RH for 7 days to obtain test plates with an anticorrosive coating film having a film thickness of about 320 µm.

After that, an X-shaped incision was formed on surfaces of the anticorrosive coating films of the obtained test plates with the anticorrosive coating film. Next, an adhesive cellophane tape was stuck onto the X-shaped incision, and one end of the tape was peeled off at an angle close to 90 degrees with respect to the surface of the anticorrosive coating film to evaluate a peeling state between the anticorrosive coating films (a peeling rate) according to the following criteria. Numerical values of the following evaluation criteria were estimated in the same manner as the above description (5).
(Evaluation Criteria)
  A: No peeling is observed.
  B: Peeling rate is from 1 to 15% of the entire film.
  C: Peeling rate is more than 15% of the entire film.

Table 1 below shows materials used in Examples of the present invention.

t-butylperoxy-2-ethylhexanoate (product name: KAYA ESTER O manufactured by Kayaku Akzo Co., Ltd.) were placed in a dropping funnel, and the mixture was dropped in the heated flask over 3 hours. During the dropping, temperature inside the flask was controlled to be a temperature of from 120 to 130° C.

After that, as a post reaction, the resultant was stirred at 125° C. for 4 hours, and then cooled down to 60° C. or less to prepare a butyl acetate solution of an acryl-based copolymer. The obtained solution had a heating residue of 50%. A part of the obtained solution was taken out and the solvent was evaporated to obtain the acryl-based copolymer. A weight-average molecular weight (Mw) of the acryl-based copolymer measured by GPC was about 15,000, and a glass transition temperature thereof measured by DSC was about −36° C.

A liquid acrylic resin of (Note 17) was prepared as follows:

The liquid acrylic resin of (Note 17) was prepared in the same manner as the resin of (Note 16) except that, in the preparation of the resin of (Note 16), 100 g of n-butyl acrylate, 100 g of iso-butyl acrylate, and KAYA ESTER O (1.6 g) were replaced by 200 g of n-butyl acrylate and KAYA ESTER O (0.9 g). The obtained resin had a weight-average molecular weight (Mw) of about 15000 and a glass transition temperature of about −52° C.

TABLE 1

| | |
|---|---|
| (Note 1) | "E-028-90X" (product name): Bisphenol A-type liquid epoxy resin, nonvolatile content 90% (manufactured by Ohtake-Meishin Chemical Co., Ltd.) |
| (Note 2) | "E-834-85X" (product name): Bisphenol A-type semi-solid epoxy resin, nonvolatile cotent 85% (manufactured by Ohtake-Meishin Chemical Co., Ltd.) |
| (Note 3) | "NEOPOLYMER E-100": hydroxyl group-containing petroleum resin, softening point 100° C. (manufactured by Nippon Petrochemicals Co. Ltd.) |
| (Note 4) | "NOVARES CA 100": hydroxyl group-containing coumarone resin, softening point 100° C. (manufactured by Rutgers Chemicals AG) |
| (Note 5) | "HILENOL PL-1000S" (product name): liquid hydrocarbon resin, nonvolatile content 97% (manufactured by Kolon Chemical Co., Ltd.) |
| (Note 6) | "KBM 403" (product name): silane coupling agent (manufactured by Shin-Etsu Chemical Co., Ltd.) |
| (Note 7) | "TALC F-2" (product name): talc (manufactured by Fuji Talc Industrial Co., Ltd.) |
| (Note 8) | "SUZORITE MICA 200-HK" (product name): mica (manufactured by Kuraray Trading Co., Ltd.) |
| (Note 9) | "POTASSIUM FELDSPAR KM325" (product name): potassium feldspar(manufactured by Commercial Minerals Ltd.) |
| (Note 10) | "TITANIUM WHITE R-5N": titanium white (titanium dioxide, manufactured by Sakai Chemical Industry Co., Ltd.) |
| (Note 11) | "TAROX LL-XLO": yellow iron oxide (manufactued by Titan Kogyo, Ltd.) |
| (Note 12) | "ASA T-250F" (product name): amide wax (manufactuerd by Itoh Oil Chemicals Co., Ltd.) |
| (Note 13) | "DISPARLON 6650" (product name): amide wax (manufactured by Kusumoto Chemicals, Ltd.) |
| (Note 14) | "BENTONE SD-2" (product name): organic bentonite(manufactured by Elementis Specialties, Inc.) |
| (Note 15) | "AEROSIL R972" (product name): silicon dioxide (surface-treated product) (manufactured by Nippon Aerosil Co., Ltd.) |
| (Note 16) | Butyl acetate solution of n-butyl acrylate and iso-butyl acrylate copolymer, nonvolatile content 50% |
| (Note 17) | Butyl acetate solution of n-butyl acrylate polymer, nonvolatile content 50% |
| (Note 18) | Butyl acetate solution of 2-ethylhexyl acrylate polymer, nonvolatile content 50% |
| (Note 19) | "DIANAL BR-106" (product name): acryl copolymer (manufactured by Mitsubishi Rayon Co., Ltd.) |
| (Note 20) | "PA-290(A)" (product name): polyamide amine, active hydrogen equivalent 277, nonvolatile content 59% (manufactured by Ohtake-Meishin Chemical Co., Ltd.) |
| (Note 21) | "MAD-204(A)" (product name): modified polyamine, active hydrogen equivalent 202, nonvolatile content 65% (manufactured by Ohtake-Meishin Chemical Co., Ltd.) |
| (Note 22) | "ANCAMINE K-54" (product name): tertiary amine (manufactured by Air Products Japan, Inc.) |

A liquid acrylic resin of (Note 16) was prepared as follows.

Under a nitrogen gas flow, 200 g of butyl acetate was placed in a 500 ml four-neck flask and heated to 125° C. while stirring. Then, 100 g of n-butyl acrylate, 100 g of iso-butyl acrylate, and 1.6 g of a polymerization initiator:

Additionally, the liquid acrylic resin of (Note 18) was prepared in the same manner as the resin of (Note 16) except that, in the preparation of the resin of (Note 16), 100 g of n-butyl acrylate, 100 g of iso-butyl acrylate, and KAYA ESTER O (1.6 g) were replaced by 200 g of 2-ethylhexyl acrylate and, as a polymerization initiator, 0.1 g of t-butylperoxy benzoate (product name: KAYA BUTYL B manufactured by Kayaku Akzo Co., Ltd). The obtained resin had a weight-average molecular weight (Mw) of about 11000 and a glass transition temperature of about −72° C.

Example 1

As shown in Table 2 below, 19 parts by weight of an epoxy resin (Note 1), 10 parts by weight of a petroleum resin (Note 3), 4 parts by weight of a liquid petroleum resin (Note 5), 9.7 parts by weight of xylene, 2 parts by weight of butanol, 1 part by weight of 1-methoxy-2-propanol, 1 part by weight of a silane coupling agent (Note 6), 23 parts by weight of talc (Note 7), 6 parts by weight of mica (Note 8), 15 parts by weight of potassium feldspar (Note 9), 6 parts by weight of titanium white (Note 10), 1.5 parts by weight of yellow iron oxide (Note 11), 1.5 parts by weight of an anti-sagging agent (Note 12), and 0.3 parts by weight of the liquid acrylic resin (Note 16) were placed in a container. Then, glass beads were added thereto and these mixing components were mixed together using a paint shaker. Next, the glass beads were removed and dispersion was conducted at from 56 to 60° C. using a high speed disper, followed by cooling down to 30° C. or less to prepare a main agent component.

In addition, as shown in Table 2 below, 9.4 parts by weight of polyamideamine (Note 20), 4.7 parts by weight of modified polyamine (Note 21), 0.1 parts by weight of tertiary amine (Note 22), and 0.8 parts by weight of 1-methoxy-2-propanol were mixed together by a high speed disper to prepare a curing agent component.

The obtained main agent component and curing agent component were mixed together before coating to prepare a composition.

Examples 2 to 8 and Comparative Examples 1 to 4

Compositions were prepared in the same manner as Example 1 except that components and mixing amounts thereof to be used in the main agent component and the curing agent component were changed as those shown in Table 2 below.

TABLE 2

|  | Example 1 | Example 2 | Example 3 | Example 4 | Example 5 | Example 6 | Example 7 | Example 8 | Comp. Example 1 | Comp. Example 2 | Comp. Example 3 | Comp. Example 4 |
|---|---|---|---|---|---|---|---|---|---|---|---|---|
| Epoxy resin (Note 1) | 19 | 19 | 19 | 19 | 15.5 | 0 | 19 | 19 | 19 | 19 | 0 | 19 |
| Epoxy resin (Note 2) | 0 | 0 | 0 | 0 | 3 | 20.5 | 0 | 0 | 0 | 0 | 22 | 0 |
| Petroleum resin (Note 3) | 10 | 14 | 0 | 0 | 10 | 4 | 10 | 10 | 10 | 10 | 4 | 10 |
| Coumarone-indene resin (Note 4) | 0 | 0 | 10 | 10 | 0 | 0 | 0 | 0 | 0 | 0 | 0 | 0 |
| Liquid petroleum resin (Note 5) | 4 | 0 | 4 | 4 | 4 | 10 | 4 | 4 | 4 | 4 | 10 | 4 |
| Xylene | 9.7 | 9 | 9.8 | 9.7 | 10 | 8.1 | 9.7 | 9.7 | 10 | 10 | 9 | 9.8 |
| Butanol | 2 | 2 | 2 | 2 | 2 | 2 | 2 | 2 | 2 | 2 | 2 | 2 |
| 1-methoxy-2-propanol | 1 | 1 | 1 | 1 | 1 | 1 | 1 | 1 | 1 | 1 | 1 | 1 |
| Silane coupling agent (Note 6) | 1 | 1 | 1 | 1 | 1 | 1 | 1 | 1 | 1 | 1 | 1 | 1 |
| Talc (Note 7) | 23 | 23 | 23 | 23 | 23 | 23 | 23 | 23 | 23 | 23 | 22 | 23 |
| Mica (Note 8) | 6 | 6 | 6 | 6 | 6 | 6 | 6 | 6 | 6 | 6 | 6 | 6 |
| Potassium feldspar (Note 9) | 15 | 15 | 15 | 15 | 15 | 15 | 15 | 15 | 15 | 15 | 14 | 15 |
| Titanium white (Note 10) | 6 | 6 | 6 | 6 | 6 | 6 | 6 | 6 | 6 | 6 | 6 | 6 |
| Yellow iron oxide (Note 11) | 1.5 | 1.5 | 1.5 | 1.5 | 1.5 | 1.5 | 1.5 | 1.5 | 1.5 | 1.5 | 1.5 | 1.5 |
| Anti-sagging agent (Note 12) | 1.5 | 1 | 1 | 0 | 1.5 | 0 | 1.5 | 1.5 | 1.5 | 0 | 1.5 | 1.5 |
| Anti-sagging agent (Note 13) | 0 | 0 | 0 | 1.5 | 0 | 1.5 | 0 | 0 | 0 | 1.5 | 0 | 0 |
| Organic bentonite (Note 14) | 0 | 0.3 | 0.3 | 0 | 0 | 0 | 0 | 0 | 0 | 0 | 0 | 0 |
| Fumed silica (Note 15) | 0 | 0.2 | 0.2 | 0 | 0 | 0 | 0 | 0 | 0 | 0 | 0 | 0 |
| Liquid acrylic resin (Note 16) | 0.3 | 1 | 0.2 | 0.3 | 0.5 | 0.4 | 0 | 0 | 0 | 0 | 0 | 0 |
| Liquid acrylic resin (Note 17) | 0 | 0 | 0 | 0 | 0 | 0 | 0.3 | 0 | 0 | 0 | 0 | 0 |
| Liquid acrylic resin (Note 18) | 0 | 0 | 0 | 0 | 0 | 0 | 0 | 0.3 | 0 | 0 | 0 | 0 |
| Solid acrylic resin (Note 19) | 0 | 0 | 0 | 0 | 0 | 0 | 0 | 0 | 0 | 0 | 0 | 0.2 |
| Subtotal (parts by weight) | 100 | 100 | 100 | 100 | 100 | 100 | 100 | 100 | 100 | 100 | 100 | 100 |
| Polyamideamine (Note 20) | 9.4 | 9.4 | 9.4 | 9.4 | 9.4 | 8 | 9.4 | 9.4 | 9.4 | 9.4 | 8 | 9.4 |
| Modified polyamine (Note 21) | 4.7 | 4.7 | 4.7 | 4.7 | 4.7 | 4 | 4.7 | 4.7 | 4.7 | 4.7 | 4 | 4.7 |
| Tertiary amine (Note 22) | 0.1 | 0.1 | 0.1 | 0.1 | 0.1 | 0.2 | 0.1 | 0.1 | 0.1 | 0.1 | 0.2 | 0.1 |
| 1-methoxy-2-propanol | 0.8 | 0.8 | 0.8 | 0.8 | 0.8 | 0.3 | 0.8 | 0.8 | 0.8 | 0.8 | 0.3 | 0.8 |
| Subtotal (parts by weight) | 15 | 15 | 15 | 15 | 15 | 12.5 | 15 | 15 | 15 | 15 | 12.5 | 15 |
| Total (parts by weight) | 115 | 115 | 115 | 115 | 115 | 112.5 | 115 | 115 | 115 | 115 | 112.5 | 115 |
| Color of coating film | Cream | Cream | Cream | Cream | Cream | Cream | Cream | Cream | Cream | Cream | Cream | Cream |
| Salt water resistance | A | A | A | A | A | A | A | A | A | A | A | A |

TABLE 2-continued

|  | Example 1 | Example 2 | Example 3 | Example 4 | Example 5 | Example 6 | Example 7 | Example 8 | Comp. Example 1 | Comp. Example 2 | Comp. Example 3 | Comp. Example 4 |
|---|---|---|---|---|---|---|---|---|---|---|---|---|
| Electric anticorrosion test | A | A | A | A | A | A | A | A | A | A | A | A |
| Salt water spray test | A | A | A | A | A | A | A | A | A | A | A | A |
| High temperature and high humidity resistance | A | A | A | A | A | A | A | A | A | A | A | A |
| Second coating adhesion | A | A | A | A | A | A | A | A | A | A | A | A |
| Adhesion onto dust spray | A | A | A | A | A | A | B | A | C | C | C | C |

REFERENCE SIGNS LIST

1: Anticorrosive Coating Film
2: X-shaped incision
3: Incision-formed area

The invention claimed is:

1. An anticorrosive coating composition, comprising an epoxy resin (a), a curing agent (h), an amide wax (c), and a liquid acrylic polymer (d), wherein said liquid acrylic polymer (d) comprises a structural unit derived from an acrylate having an alkyl group of 4 to 18 carbon atoms and has a glass transition temperature of −36° C. or less.

2. The anticorrosive coating composition according to claim 1, wherein the liquid acrylic polymer (d) comprises a structural unit derived from an acrylate having an alkyl group of 4 to 18 carbon atoms containing a branched structure.

3. The anticorrosive coating composition according to claim 1, wherein the liquid acrylic polymer (d) comprises a structural unit derived from isobutyl acrylate or 2-ethylhexyl acrylate.

4. The anticorrosive coating composition according to claim 3, wherein the liquid acrylic polymer (d) comprises the structural unit derived from isobutyl acrylate or 2-ethylhexyl acrylate in an amount of from 30 to 100% by weight with respect to the whole of the liquid acrylic polymer (d).

5. The anticorrosive coating composition according to claim 3, wherein the liquid acrylic polymer (d) further comprises a structural unit derived from n-butyl acrylate.

6. The anticorrosive coating composition according to claim 1, wherein the liquid acrylic polymer (d) has a glass transition temperature of −36° C. to −72° C.

7. The anticorrosive coating composition according to claim 1, wherein the composition comprises the liquid acrylic polymer (d) in an amount of from 0.01 to 5 parts by weight (a nonvolatile content) with respect to 100 parts by weight of a nonvolatile content in the anticorrosive coating composition.

8. The anticorrosive coating composition according to claim 1, wherein the composition comprises the amide wax (c) in an amount of from 0.05 to 15 parts by weight (a nonvolatile content) with respect to 100 parts by weight of a nonvolatile content in the anticorrosive coating composition.

9. The anticorrosive coating composition according to claim 1, further comprising a silane coupling agent (e).

10. The anticorrosive coating composition according to claim 1, further comprising an extender pigment (f).

11. The anticorrosive coating composition according to claim 10, wherein the extender pigment (f) comprises at least a flaky pigment (g).

12. An anticorrosive coating film formed from the anticorrosive coating composition according to claim 1.

13. A method for preventing corrosion of a substrate, comprising coating the substrate with the anticorrosive coating composition according to claim 1.

14. The anticorrosive coating composition according to claim 1, wherein the epoxy resin (a) has an epoxy equivalent of 150 to 1000 and a weight-average molecular weight measured by gel permeation chromatograph of 350 to 20,000.

15. The anticorrosive coating composition according to claim 1, wherein the liquid acrylic polymer (d) comprises a homopolymer or copolymer of at least one acrylate selected from n-butyl acrylate, iso-butyl acrylate, tert-butyl acrylate, 2-ethylhexyl acrylate, hexyl acrylate, heptyl acrylate, n-octyl acrylate, isooctyl acrylate, n-nonyl acrylate, isononyl acrylate, decyl acrylate, lauryl acrylate, tridecyl acrylate, and stearyl acrylate.

16. The anticorrosive coating composition according to claim 1, wherein the liquid acrylic polymer (d) comprises a copolymer of
at least one acrylate selected from n-butyl acrylate, iso-butyl acrylate, tort-butyl acrylate, 2-ethylhexyl acrylate, hexyl acrylate, heptyl acrylate, n-octyl acrylate, isooctyl acrylate, n-nonyl acrylate, isononyl acrylate, decyl acrylate, lauryl acrylate, tridecyl acrylate, and stearyl acrylate, and
at least one other monomer selected from methyl (meth)acrylate, ethyl (meth)acrylate, 2-methoxyethyl (meth)acrylate, 2-ethoxyethyl acrylate, phenoxyethyl (meth)acrylate, 2-(2-ethylhexaoxy)ethyl (meth)acrylate, 1-methyl-2-methoxyethyl (meth)acrylate, 3-methoxybutyl (meth)acrylate, 3-methyl-3-methoxybutyl (meth)acrylate, m-methoxyphenyl (meth)acrylate, p-methoxyphenyl (meth)acrylate, o-methoxyphenyl ethyl (meth)acrylate, m-methoxyphenyl ethyl (meth)acrylate, p-methoxyphenyl ethyl (meth)acrylate, n-propyl (meth)acrylate, iso-propyl (meth)acrylate, n-butyl methacrylate, iso-butyl methacrylate, tert-butyl methacrylate, 2-ethylhexyl methacrylate, laurel methacrylate, stearyl methacrylate, benzyl (meth)acrylate, phenyl (meth)acrylate, isobornyl (meth)acrylate, cyclohexyl (meth)acrylate, glycidyl (meth)acrylate, dicyclopentenyl (meth)acrylate, 2-dicyclopentenoxy ethyl (meth)acrylate, butylaminoethyl (meth)acrylate, (meth)acrylamide, dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylamide, dimethylaminopropyl (meth)acrylamide, vinylpyrrolidone, vinylpyridine, vinylcarbazole, styrene, vinyl toluene, α-methyl styrene, (meth)acrylonitrile, vinyl acetate, and vinyl propionate.

* * * * *